Figure 1:
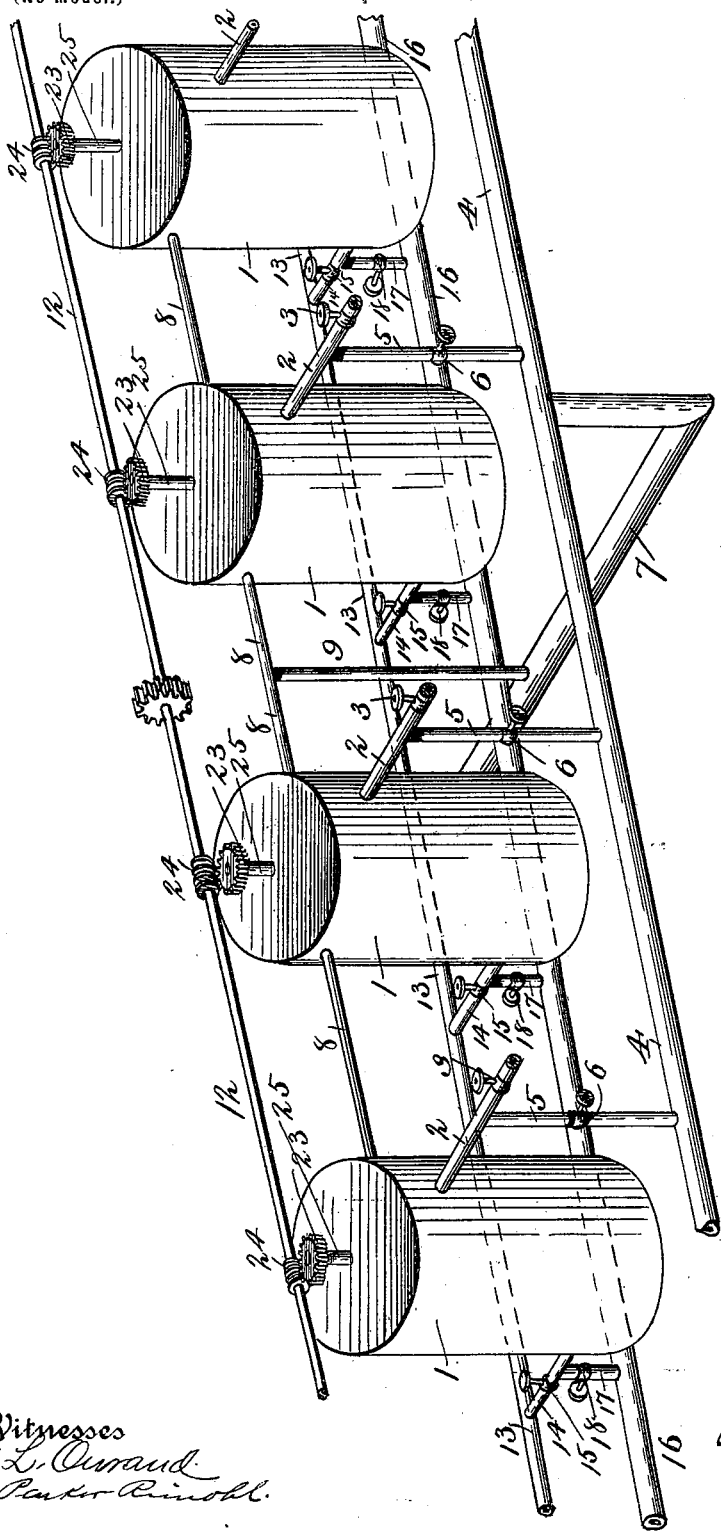

No. 667,004. Patented Jan. 29, 1901.
J. DAVIS.
FILTER.
(Application filed Sept. 28, 1900.)
(No Model.) 3 Sheets—Sheet 1.

Witnesses
F. L. Ouvaud
W. Parker Reinohl

Inventor
John Davis,
By D. L. Reinohl.
Attorney

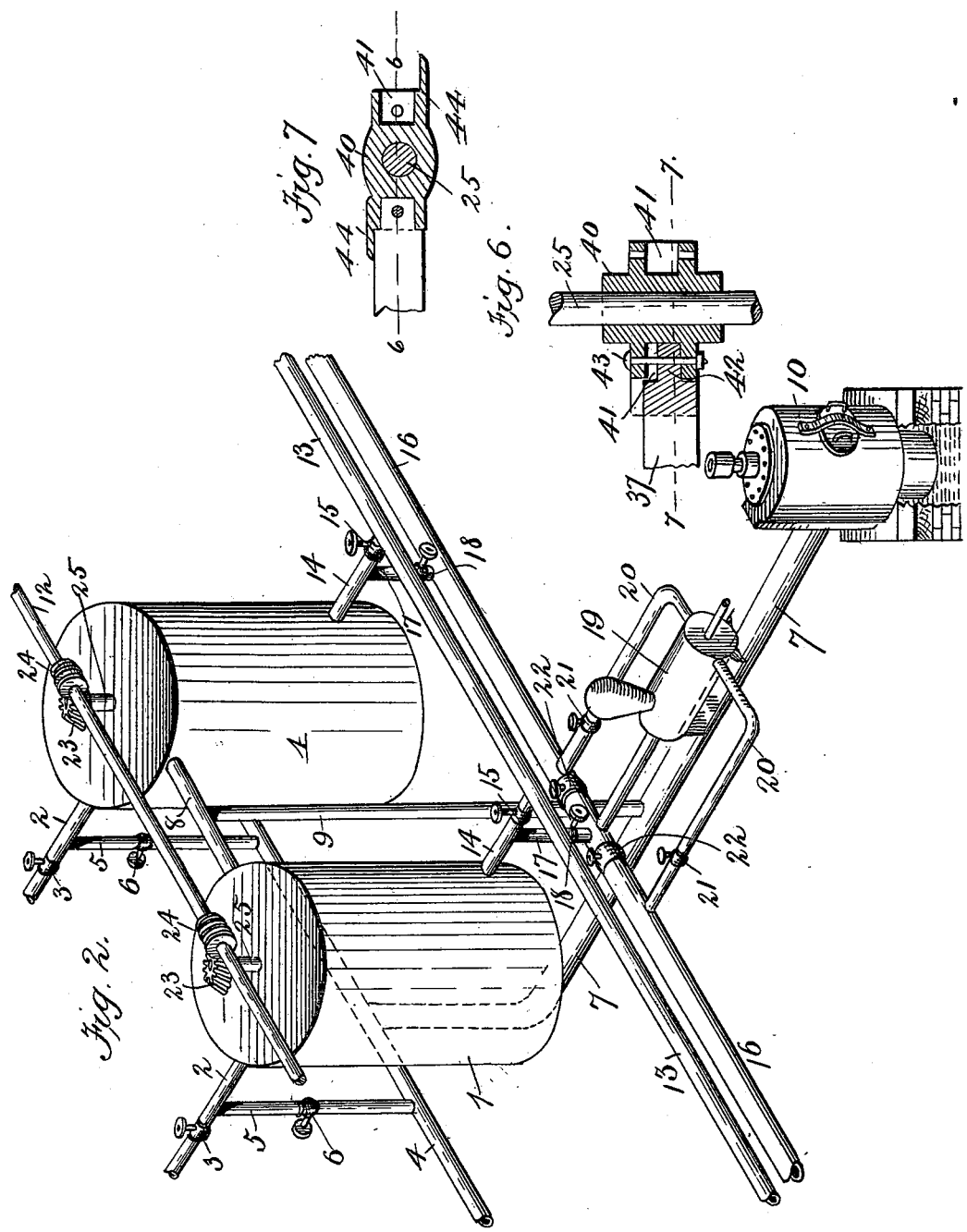

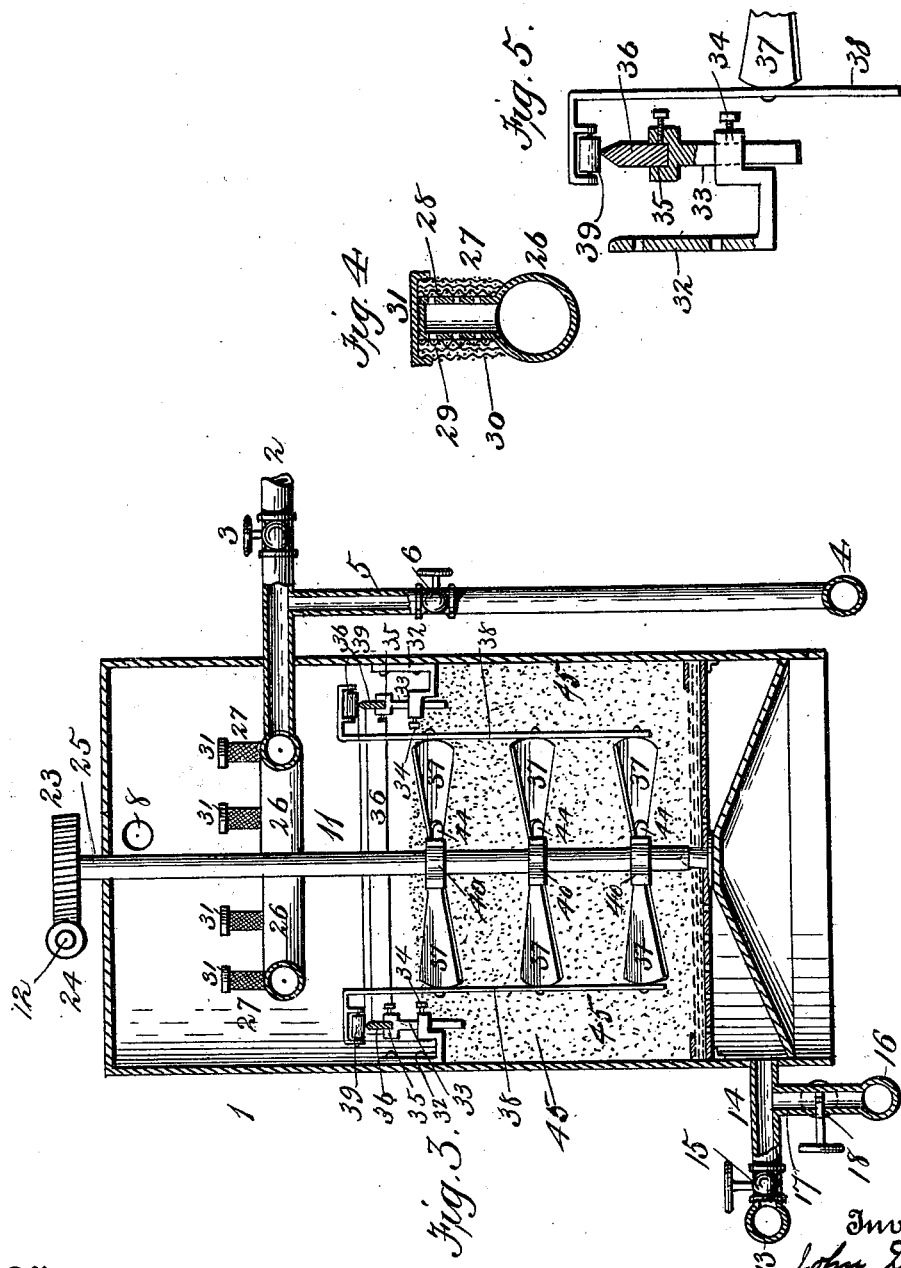

UNITED STATES PATENT OFFICE.

JOHN DAVIS, OF PITTSBURG, PENNSYLVANIA.

FILTER.

SPECIFICATION forming part of Letters Patent No. 667,004, dated January 29, 1901.

Application filed September 28, 1900. Serial No. 31,397. (No model.)

*To all whom it may concern:*

Be it known that I, JOHN DAVIS, a citizen of the United States, residing at Pittsburg, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My invention relates to filters, has especial reference to that class of filters in which a granular bed is used, and consists in certain improvements in construction which will be fully disclosed in the following specification and claims.

In the accompanying drawings, which form part of this specification, Figure 1 is a perspective showing the front part of a battery of filters; Fig. 2, a like view on an enlarged scale, showing the opposite side; Fig. 3, a vertical section of one of the filters; Fig. 4, a like view, on an enlarged scale, of one of the supply water-discharge nozzles; Fig. 5, an enlarged detail of the means for supporting the ends of the blades of the agitator; Fig. 6, a vertical section of the hub and part of one blade of the agitator on line 6 6, Fig. 7, the shaft being shown in side elevation; and Fig. 7, a horizontal section of the same on line 7 7, Fig. 6.

Reference being had to the drawings and the numerals thereon, 1 indicates the filters arranged in a battery or group and of which there may be any desired number connected to a suitable source of supply (not shown) by pipes 2, provided with valves 3, and said pipes 2 are connected to a waste-pipe 4 by pipes 5, provided with valves 6, and the waste-pipe is connected to a pipe 7, with which the overflow-pipes 8 connect by means of pipe 9, and the waste and the overflow water is conducted to a water-motor 10, preferably a turbine water-wheel, for supplying power to operate the agitators 11 in the filters and for pumping filtered water to cleanse the filter-beds of the filters. The motor may be connected to the agitator-shaft 12 in the usual way for transmitting power, the details of which are familiar to the skilled mechanic. On the opposite side the filters are connected to a distributing-pipe 13 for filtered water by pipes 14, having valves 15, and the pipes 14 are connected to a pipe 16 for supplying filtered water to wash or cleanse the filter-beds by pipes 17, provided with valves 18, and the pipe 16 is connected to a pump 19 by branch pipes 20, having valves 21, and in the pipe 16 are valves 22 to direct the supply and the discharge to and from the pump in either direction desired by the proper manipulation of the several valves, which is well understood and requires no further elucidation.

The agitators 11 are provided at the upper ends of their shafts 25 with gear-wheels 23, which are engaged by gear-wheels 24 on shaft 12, and the latter gear-wheels are provided with suitable clutch mechanism, (not shown,) by which any filter in the plant or battery may be thrown into or out of connection with the shaft 12 and the source of power.

The pipe 2 communicates with a distributing-pipe 26 within the filter, which is provided with vertical discharge-nozzles 27, having a perforated body, and is surrounded by three layers of wire-cloth 28, 29, and 30, the intermediate layer 29 being of fine mesh and the layers 28 and 30 of coarse mesh to prevent the waste of the filter-bed in cleaning. The several layers of wire-cloth are soldered at their meeting edges, and a cap 31 may be placed over the outer end of the nozzles and the wire-cloth and soldered thereto.

To the body of the filter are secured brackets 32, in which are supported vertically-adjustable posts 33, secured by screws 34, and in the slots 35 of said posts rests a circular track 36, which is properly alined by the adjustment of the posts 33 until it is brought into a true horizontal plane.

The outer ends of the blades 37 of the agitator 11 are connected to the bar 38, which is provided with a roller 39 at its upper end, which rests upon the track 36, and thereby supports the weight of the blades at their outer ends. The hubs 40 of the agitator are provided with vertical slots 41 of a width equal to the thickness of shank 42 of the blades 37 and of a greater height than the height of the shank to provide for vertical movement of the blades to accommodate any slight irregularity in the alinement of the track, due to settling of the filters or from any other cause, such as imperfect alinement.

The blades are secured in the hubs by bolts 43, and a support 44 extends out on each side of the hub to stiffen the blade and strengthen it as it meets with resistance in moving through the filter-bed 45.

In cleaning the filters after the pump has been operated a few minutes or until the filter-bed has loosened sufficiently the agitators are put into operation by connection with the turbine or other motor and the filter-bed thoroughly agitated.

Having thus fully described my invention, what I claim is—

1. A filter-supply pipe provided with vertical discharge-nozzles having a perforated body and surrounded by wire-cloth arranged in separate layers with a layer of fine mesh interposed between strata of coarse mesh.

2. A filter having an agitator whose blades are connected at their outer ends, and means independent of the shaft of the agitator for sustaining the weight of the blades.

3. A filter having a track; in combination with an agitator having blades supported at their outer ends from said track.

4. A filter having a track supported in vertically-adjustable posts; in combination with an agitator having blades supported at their outer ends from said track.

5. A filter having an agitator provided with blades vertically adjustable in the hub.

6. A filter having an agitator provided with blades vertically adjustable in the hub, in combination with the track upon which the outer ends of the blades are supported.

7. A filter plant provided with means for collecting the overflow and waste water used for cleaning the filter-beds, in combination with a motor operated by said water.

In testimony whereof I affix my signature in presence of two witnesses.

JOHN DAVIS.

Witnesses:
WM. W. WISHART,
ALEXANDER WISHART.